United States Patent [19]

Hartmann et al.

[11] 3,922,439

[45] Nov. 25, 1975

[54] MAGNETIC RECORDING MEDIA

[75] Inventors: Hans-Joerg Hartmann, Freinsheim; Job-Werner Hartmann; Harald Frischman, both of Ludwigshafen; Güenter Vaeth, Limburgerhof, all of Germany

[73] Assignee: Badische Anilin- & Soda-Fabrik Aktiengesellschaft, Ludwigshafen (Rhine), Germany

[22] Filed: Nov. 15, 1972

[21] Appl. No.: 306,674

[30] Foreign Application Priority Data

Nov. 20, 1971 Germany ............................ 2157685

[52] U.S. Cl. ....... 428/425; 117/161 KP; 117/240 M; 428/900

[51] Int. Cl. ............................................ H01f 10/02

[58] Field of Search ............................ 117/235–240; 252/62.54, 161 KP

[56] References Cited

UNITED STATES PATENTS

| | | | |
|---|---|---|---|
| 3,144,352 | 8/1964 | Talley | 117/235 |
| 3,470,021 | 9/1969 | Hendrick et al. | 117/237 X |
| 3,499,789 | 3/1970 | Delmore | 117/235 |
| 3,574,684 | 4/1971 | Higashi | 117/237 |
| 3,586,630 | 6/1971 | Ingersoll | 117/235 X |
| 3,634,252 | 1/1972 | Graham | 117/235 X |
| 3,649,541 | 3/1972 | Ingersoll | 117/235 X |
| 3,650,828 | 3/1972 | Higashi et al. | 117/237 X |

*Primary Examiner*—Bernard D. Pianalto
*Attorney, Agent, or Firm*—Johnston, Keil, Thompson & Shurtleff

[57] ABSTRACT

Magnetic recording media comprising a non-magnetic support and a magnetic layer based on a dispersion of finely divided magnetic pigment in a binder consisting of a mixture of a special soluble hydroxyl-free polyester urethane.

4 Claims, No Drawings

MAGNETIC RECORDING MEDIA

The present invention relates to magnetic recording media comprising a non-magnetic support and, applied thereto, a magnetic layer based on a finely divided magnetic pigment dispersed in a binder mixture containing a polyurethane, and a process for the production of such magnetic recording media using a special binder mixture containing a polyurethane.

Magnetic recording media employing polyurethanes as binder for the magnetic layer have been known a long time. Polyurethanes have proved to be particularly suitable as binders for magnetic recording media which are subjected to hard wear. Polyester urethanes such as are described for example in German printed application No. 1,106,959 are, however, not suitable as sole binder because they do not impart sufficient hardness to the surface of the magnetic layer. There have therefore been many proposals to combine polyurethanes with other binders to obtain better properties. German printed application No. 1,269,661 discloses the use of a mixture of polyurethanes and polyesters for the production of magnetic recording media. However, this does not eliminate the risk of adjacent layers of tape blocking under conditions of elevated temperature and pressure; there is even a slight tendency for the tape to block at room temperature. U.S. Pat. No. 3,144,352 describes the addition of vinylidene chloride/acrylonitrile copolymers to polyurethanes as binders. These copolymers are, however, known to be not very thermostable (cf. German published application No. 2,037,605 which corresponds to U.S. Pat. No. 3,650,828). The magnetic dispersions therefore have to have stabilizers added to them, which can adversely effect other properties.

The combination of polyurethanes with a vinyl chloride/vinyl acetate copolymer is disclosed in German printed application No. 1,282,700. Although vinyl chloride copolymers are more stable than vinylidene chloride copolymers, they have, as is well known, marked thermoplastic properties, it therefore being impossible to achieve the desired mechanical properties at elevated temperature. According to German printed application No. 1,295,011 polyurethane binders are modified by the use of fairly high molecular weight phenoxy resins. However, even magnetic layers having these binders soften to a marked extent when stored at elevated temperature, which results in them having a tendency to adhere to the opposite tape base. It is known from German published application No. 2,037,605 to use a vinyl polymer such as vinyl chloride/vinyl acetate copolymer, a polyvinyl butyral or a polyvinyl formal together with a hydroxyl-containing polyurethane/polyurea elastomer for magnetic mixes. However, with these binder combinations there is a risk that changes may occur in the magnetic layer when the tape is stored in an atmosphere having a fairly high degree of humidity as a result of the ability of the hydroxyl-containing polyurethane/polyurea elastomer to absorb water. German published application No. 1,908,945 also discloses the use of polyvinyl formal as binder for magnetic layers. However, magnetic layers prepared according to the Example of this published application are not resistant enough to mechanical wear and also tend to block, as a result of which they do not satisfy the requirements placed on modern magnetic recording media.

We have now found that magnetic recording media comprising a non-magnetic support and, applied thereto, a magnetic layer based on a finely divided magnetic pigment dispersed in a polyurethane-containing binder mixture, and exhibiting a combination of good mechanical and magnetic properties can be advantageously produced by using as the polyurethane-containing binder mixture a mixture consisting essentially of a. 15 to 80 parts by weight of a thermoplastic soluble polyester urethane containing practically no hydroxyl groups and prepared from an aliphatic dicarboxylic acid of 4 to 6 carbon atoms, an aliphatic diol of 3 to 10 carbon atoms and a diisocyanate of 8 to 20 carbon atoms, and b. 20 to 85 parts by weight of a polyvinyl formal.

We have also found that magnetic recording media of the said type having very good properties can be produced by adding a minor amount of a polyisocyanate to the binder mixture while the latter is being combined or after it has been combined with the finely divided magnetic pigment.

Particularly suitable soluble, thermoplastic, virtually hydroxyl-free polyester urethanes derived from an aliphatic dicarboxylic acid of 4 to 6 carbon atoms, such as adipic acid, at least one aliphatic diol of 3 to 10 carbon atoms, such as propylene glycol, butanediol-1,4, diethylene glycol, hexanediol-1,6, and octanediol, and a diisocyanate of 8 to 20 carbon atoms, such as toluylene diisocyanate, 4,4'-diisocyanatodiphenylmethane and m-xylylene diisocyanate, are polyester urethanes such as are prepared according to German printed application No. 1,106,959. They should exhibit thermoplastic and advantageously also elastomeric properties and should, in addition, be practically free from hydroxyl, groups. It is prefered to use soluble thermoplastic polyurethanes derived from adipic acid, butanediol-1,4 and a diisocyanatodiphenylalkane, such as 4,4,'-diisocyanatodiphenylmethane, such as are obtained for example by reacting a hydroxyl-containing polyester of adipic acid and butanediol-1,4 with the diisocyanate, preferably in the presence of glycol for the purpose of chain extension, approximately equivalent amounts of isocyanate groups and hydroxyl groups being used. Suitable polyester urethanes have a tensile strength of about 300 to 500 kg/cm$^2$ and an elongation at break of about 300 to 700%.

Suitable polyvinyl formal binders are for example polymers which have been prepared in a conventional manner by hydrolysis of a vinyl ester polymer followed by reaction of the vinyl alcohol polymer with formaldehyde. They advantageously contain at least 65%, particularly at least 80%, by weight of vinyl formal groups. Highly suitable polyvinyl formals contain 5 to 13% by weight of vinyl alcohol groups, 7 to 15% by weight of vinyl acetate groups and 80 to 88% by weight of vinyl formal groups, and have a specific gravity of 1.2 and a viscosity of 50 to 120 cps (measured at 20°C using a solution of 5 g of polyvinyl formal in 100 ml of a mixture of phenol and toluene in a ratio of 1:1).

According to the invention mixtures of 15 to 80 parts of polyester urethane and 20 to 85 parts by weight of polyvinyl formal are usually used. However, for applications where the magnetic layer is subjected to particularly high stresses, e.g., in video recording, mixtures of 60 to 80 parts by weight of polyester urethane and 20 to 40 parts by weight of polyvinyl formal are preferred. Magnetic layers employing a combination of 70 to 85 parts by weight of polyvinyl formal and 15 to 30 parts by weight of polyester urethane as binder are very suitable for sound recordings.

The mechanical properties of the magnetic layers prepared according to the invention, particularly the surface hardness and the mechanical properties at elevated operating temperatures, can be further improved by the subsequent addition of a polyisocyanate, preferably a diisocyanate or a triisocyanate, e.g., 4,4'-diisocyanatodiphenylmethane, or the reaction product of 3 moles of toluylene diisocyanate and 1 mole of 1,1,1-trimethylolpropane. The polyisocyanate is advantageously added to the binder mixture while the latter is being combined or after it has been combined with the magnetic pigment, in a minor amount, particularly in an amount of from 2 to 25% by weight based on the amount of binder mixture used.

For the production of the magnetic dispersions, which is carried out in a conventional manner, the polyvinyl formal polymers and the polyester urethanes are dissolved in organic solvents such as tetrahydrofuran, methyl ethyl ketone, dimethyl formamide and dioxane or mixtures thereof. Other solvents such as esters, ketones and aromatics may be added to the solvent. In addition, small amounts of dispersing agents, fillers and/or lubricants can be added before or during dispersion of the magnetic pigment for the production of the magnetic dispersion or before or during production of the magnetic coating. Examples of suitable additives are metallic soaps such as salts of fatty acids or isomerized fatty acids and metals of main groups I to IV of the periodic system, stearic acid, fatty acid esters, waxes, paraffin oils, silicone oils, carbon black, talc and particulate silicates. These additives are generally used in amounts not exceeding 3% by weight with reference to the magnetic layer.

There may be used as magnetic pigments those conventionally employed for this purpose, the properties of the finished magnetic coating being governed by the magnetic pigment used. Examples of magnetic pigments are $\gamma$-iron(III) oxide, particulate magnetite, ferromagnetic chromium dioxide and ferromagnetic metals and metal alloy pigments, e.g., alloys of iron and cobalt such as are prepared for example according to the instructions given in German Patent 1,247,026. A preferred magnetic pigment is acicular $\gamma$-iron(III) oxide. The particle size of the magnetic pigments is generally from 0.2 to 2$\mu$, preferably from 0.3 to 0.8$\mu$.

The weight ratio of magnetic pigments to binder in the recording media of the invention is generally from 2 to 10:1, particularly from 3 to 5:1. It is a particular advantage of the mixes of the invention that, by virtue of the outstanding pigment binding power, high magnetic pigment concentrations can be achieved in the magnetic layers without their mechanical properties being impaired and their service characteristics suffering appreciably.

Conventional rigid or flexible base materials may be used as non-magnetic and non-magnetizable supports. Examples of typical flexible bases are polyvinyl chloride films, particularly films of linear polyesters such as polyethylene terephthalate, having a thickness of from 5 to 50$\mu$, particularly from 10 to 36$\mu$. Aluminum discs may for example be used as rigid non-magnetizable supports. More recently the use of magnetic coatings on paper supports has become important for electronic computing and accounting machines; the coating materials of the invention may be used with advantage for this purpose, too.

The magnetic coatings may be prepared in a conventional manner. The magnetic dispersion prepared from the magnetic pigment and the binder solution in the presence or absence of dispersing agents and other additives in dispersing apparatus, e.g., a tube mill and a stirred ball mill, is advantageously filtered and applied to the non-magnetizable support using conventional coating equipment, e.g., a knife coater. As a rule the magnetic particles are oriented by passing the coated material through a magnetic field before drying which is advantageously out at a temperature of from 50° to 90°C for from 2 to 5 minutes. If binder mixtures are used, to which polyisocyanates have been added, there is no need, in contrast to some known polyisocyanate binders, to subject the coated material to a heat treatment after coating, i.e., one which goes beyond normal physical drying, e.g., tempering.

The magnetic layers can be subjected to a conventional surface treatment, e.g., calendering in which the coated material is passed between heated polish rolls, with the optional application of pressure and optional heating at temperatures of from 50° to 100°C, preferably from 60° to 80°C. Following this treatment the thickness of the magnetic layer is generally from 3 to 20$\mu$, preferably from 8 to 15$\mu$. In the case of the production of flexible magnetic tapes the coated webs are slit in the longitudinal direction to the usual widths.

The binder mixtures to be used according to the invention are intended in particular for magnetic coatings which require a heat treatment to remove the solvent and to obtain a dry surface but which in principle do not react when heated. Heat curing proper would in any case not be suitable for most flexible base materials, e.g., polyvinyl chloride film, paper, polyethylene terephthalate film, because it would adversely effect them. When the binder mixtures of the invention are used for the production of rigid recording media, e.g., magnetic discs, some properties of the resulting magnetic coatings can be further improved by the addition of small amounts of heat-curable crosslinking agents, particularly 1 to 30% by weight of the binder mixture. Examples of such crosslinking agents are curable urea-formaldehyde precondensates, curable phenolformaldehyde precondensates (prepared by reacting urea, phenol or a phenol substituted by $C_1$ to $C_4$ alkyl groups with 1.5 to 3 times the molar amount of formaldehyde, preferably in alkaline medium) and/or the ethers thereof with alcohols of 1 to 7 carbon atoms or the esters thereof with aliphatic carboxylic acids of 2 to 20 carbon atoms. The crosslinking agents added should be substantially compatible with the binder, particularly in the case of heat-resistant magnetic coatings on special tape base material, such as polyimide film, or on rigid supports, such as discs or drums.

The invention is further illustrated by the following Examples.

EXAMPLE 1

A tube mill having a volume of 250 l is charged with 200 kg of steel balls having a diameter of from 6 to 8 mm and with the following mixture:

37.2 kg of acicular $\gamma$-iron(III) oxide; 2,8 kg of conductive carbon; 0.2 kg of stearic acid; 0.8 kg of isopropyl myristate; 26.5 kg of a 13% solution of a thermoplastic polyester urethane prepared from adipic acid, butanediol-1,4 and 4,4'-diisocyanatodiphenylmethane in a mixture of equal parts by weight of tetrahydrofuran and dioxane; 11.5 kg of a 13% solution of a polyvinyl formal in a mixture of equal parts by weight of tetrahydrofuran and dioxane; and 36.0 kg of a solvent mixture of equal parts by weight of tetrahydrofuran and dioxane.

This mixture is dispersed for 5 days and then a further 21.6 kg of the above polyester urethane solution and a further 8.5 kg of the above polyvinyl formal solution are added.

Dispersion is continued for a further 7 days, following which the resulting magnetic dispersion is filtered under pressure through filter paper and applied to 25 $\mu$ thick polyethylene terephthalate film using a knife coater. Drying is effected for 3 to 5 minutes at a temperature of from 70° to 90°C. The coated material is then calendered by passing it between heated rolls (80°C) at a nip pressure of about 3 kg/cm, and slit into tapes ¼-inch wide, the thickness of the magnetic coating being 10 $\mu$.

The resistance of the magnetic tapes to thermal and mechanical stress is measured in the following manner:

A magnetic tape ¼-inch wide is drawn over a flat surface at a velocity of 0.5 mm/sec under a tension of 5 g. A special stylus having a diamond tip whose radius of curvature is 50 $\mu$, the angle at the tip being 40°, is pressed against the magnetic layer with a force of 5 g; the tip of the stylus is heated to 70°C. The depth of the resulting groove is measured using a Perth-O-Meter manufactured by Fa. Perthen, Hanover, Germany. It is 0.8 $\mu$ and shows that the magnetic recording media according to the invention are very resistant to thermal and mechanical stress.

Comparative Experiment A

The procedure of Example 1 is followed except that the polyvinyl formal is replaced by a phenoxy resin according to German Printed Application No. 1,295,011. The depth of the groove produced in the said test is 1.0 $\mu$.

Comparative Experiment B

The procedure of Example 1 is followed except that the polyvinyl formal is replaced by a vinyl chloride/vinyl acetate copolymer according to German printed application No. 1,282,700. The depth of the groove produced in the said test is 1.0 $\mu$.

Comparative Experiment C

The procedure of Example 1 is followed except that the polyvinyl formal is replaced by the same amount of the polyester urethane used in Example 1, i.e., a binder consisting of polyester urethanes only is employed. The depth of the groove produced in the said test is 1.2 $\mu$.

EXAMPLE 2

A tube mill having a volume of 30 l is charged with 40 kg of steel balls having a diameter of from 4 to 6 mm and with the following mixture:

5 kg of acicular $\gamma$-iron(III) oxide having a slightly acid surface; 0.38 kg of conductive carbon; 0.027 kg of stearic acid; 0.108 kg of isopropyl myristate; 3.56 kg of a 13% solution of a polyester urethane prepared from adipic acid, butanediol-1,4 and 4.4'-diisocyanatodiphenylmethane in a mixture of equal parts by weight of tetrahydrofuran and dioxane; 1.54 kg of a 13% solution of polyvinyl formal containing 85% by weight of vinyl formal groups, 7% by weight of vinyl alcohol groups and 8% by weight of vinyl acetate groups and having a viscosity of 75 cps in a mixture of equal parts by weight of tetrahydrofuran and dioxane; and 4.4 kg of a mixture of equal parts by weight of tetrahydrofuran and dioxane.

This mixture is dispersed for 3 days and then a further 2.9 kg of the above polyester urethane solution and a further 1.14 kg of the above polyvinyl formal solution are added.

Dispersion is continued for a further 2 days, following which the resulting magnetic dispersion is filtered under pressure through filter paper and applied to 25 $\mu$ thick polyethylene terephthalate film using a knife coater. Further treatment is as described in Example 1, the thickness of the resulting magnetic coating being 12 $\mu$. The coated web is then slit into tapes ½-inch wide.

Important properties in use are the electrical resistance, retentivity, cupping and wear resistance. Magnetic tapes produced in accordance with this Example have an electrical resistance of 200 megohms/cm², a retentivity of 1015 gauss and exhibit only slight cupping; the magnetic layer exhibits only very slight wear.

Comparative Experiment D

The procedure of Example 2 is followed except that the polyvinyl formal is replaced by the same amount of polyester urethane, i.e., a binder consisting solely of polyester urethanes is used. The resulting magnetic recording media have an electrical resistance of 200 megohms/cm², a retentivity of 1005 gauss and exhibit slight cupping; the magnetic layer exhibits marked wear. This shows that the binder mixture according to Example 2, i.e., according to the present invention, improves not only the magnetic properties, resulting in an improvement in the signal level, but also the mechanical properties, i.e., wear properties, of the magnetic coating.

EXAMPLE 3

The procedure of Example 1 is followed except that the resulting coated web is slit into tapes 2 inches wide, i.e., the usual width of video tapes for instance.

Such magnetic tapes have an electrical resistance of 40 megohms/cm², a retentivity of 913 gauss and exhibit only slight cupping; the magnetic layer exhibits only very slight wear.

Comparative Experiment E

The procedure of Example 3 is followed except that polyvinyl formal is used instead polyester urethane, i.e., a binder consisting solely of polyvinyl formal is employed.

The resulting magnetic recording media have an electrical resistance of 40 megohms/cm², a retentivity of 878 gauss and exhibit very marked cupping; the magnetic layer exhibits marked wear. This shows that the magnetic and physical properties of magnetic recording media prepared in accordance with Example 3, i.e., according to the present invention, are superior to those of magnetic recording media in which the binder used consists of polyvinyl formal only.

EXAMPLE 4

2 inch magnetic tapes are produced as described in Example 3 and tested on a commercial video recorder having four heads arranged on a wheel which rotates at right angles to the direction of tape motion. 1000 m lengths of tape were recorded with a test signal, and the number of passes was ascertained after which the number of dropouts noticeably increased.

In the case of the first tape produced in accordance with the invention the number of dropouts increased from 2 to 29 after 5913 passes and in the case of the second the number of dropouts rose from 4 to 7 after 10,028 passes, whereas in the case of the third tape, which did not exhibit any dropouts at the beginning of the experiment, no dropouts could be detected after 10,043 passes.

Comparative Experiment F

The procedure of Example 4 is followed except that a mixture of polyurethane and phenoxy resin according to German printed application No. 1,295,011 is used as binder. The resulting 2 inch magnetic tapes are tested as described in Example 4.

In the case of the first tape the number of dropouts increased from 9 to 35 after 15,074 passes, in the case of the second from 2 to 28 after 3203 passes, and in the case of the third from 136 to 321 after 2264 passes.

It can be seen from these results that the magnetic tapes prepared according to Example 4 in accordance with the invention have not only a smaller number of dropouts in the original state but also a smaller number of dropouts in continuous operation than the comparison tapes.

EXAMPLES 5 and 6 and Comparative Experiments G, H, I and K

Approximately 20% by weight solutions of the following binder mixtures in tetrahydrofuran are applied to substrates in such an amount that, after drying and removal from the substrate, there are obtained clear films about 30 μ in thickness. The tensile strength, break elongation and modulus of elasticity were determined according to DIN 53,455 and DIN 53,457. The results obtained are given in Table I.

EXAMPLE 5

7 parts by weight of the polyester urethane used in Example 1 and 3 parts by weight of the polyvinyl formal used in Example 3.

Comparative Experiment G 7 parts by weight of the polyester urethane used in Example 1 and 3 parts by weight of a phenoxy resin disclosed in German printed application No. 1,295,011.

Comparative Experiment H 7 parts by weight of the polyester urethane used in Example 1 and 3 parts by weight of a vinyl chloride/vinyl acetate copolymer disclosed in German printed application No. 1,282,700.

EXAMPLE 6

The binder mixture of Example 5 with the addition of 2 parts by weight, based on the binder mixture, of a reaction product of 1 mole of 1,1,1-trimethylolpropane and 3 moles of toluylene diisocyanate.

Comparative Experiment I

The binder mixture of Comparative Experiment G with the addition of 2 parts by weight, based on the binder mixture, of polyisocyanate.

Comparative Experiment K

The binder mixture of Comparative Experiment H with the addition of 2 parts by weight, based on the binder mixture, of polyisocyanate.

TABLE I

| | Tensile strength (kg/cm²) | Elongation at break (%) | Modulus of elasticity (kg/cm²) |
|---|---|---|---|
| Example 5 | 700 | 250 | 8000 |
| Comp. Exp. G | 550 | 250 | 3000 |
| Comp. Exp. H | 600 | 250 | 4000 |
| Example 6 | 1000 | 125 | 19,500 |
| Comp. Exp. I | 680 | 80 | 13,400 |
| Comp. Exp. K | 760 | 110 | 15,000 |

Comparative Experiment L

A tube mill having a volume of 30 l is charged with 40 kg of steel balls 6 mm in diameter and with the following mixture:

5 kg of acicular γ-iron(III) oxide; 0.38 kg of conductive carbon; 0.027 kg of stearic acid; 0.108 kg of isopropyl myristate; 3.56 kg of a 13% solution of the polyester urethane used in Example 2 in a mixture of equal parts by weight of tetrahydrofuran and dioxane; 1.54 kg of a 13% solution of a polyester (prepared from adipic acid and butanediol-1,4) in a mixture of equal parts by weight of tetrahydrofuran and dioxane; and 4.4 kg of a mixture of equal parts by weight of tetrahydrofuran and dioxane.

This mixture is dispersed for 48 hours and then a further 2.9 kg of the above polyester urethane solution and 1.14 kg of the above polyester solution are added.

The resulting magnetic dispersion, which is in accordance with German printed application No. 1,269,661, is applied to 20 μ thick tape base material in such an amount that there is obtained a magnetic layer 6 μ in thickness. The magnetic particles are oriented in the longitudinal direction immediately after coating by applying a magnetic field.

Comparative Experiment M

The procedure of Comparative Experiment L is followed except that a mixture of 5 parts by weight of a butadiene/acrylonitrile copolymer, 3 parts by weight of the polyester used in Comparative Experiment L and 2 parts by weight of a polyisocyanate disclosed in German printed application No. 1,283,282 is used as binder.

Comparative Experiment N

The procedure of Comparative Experiment L is followed except that a mixture of 7 parts by weight of a hydroxyl-containing polyurethane-polyurea according to German published application No. 2,037,605 and 3 parts by weight of polyvinyl formal is used as binder.

EXAMPLE 7

The procedure of Comparative Experiment L is followed except that a mixture of 7 parts by weight of polyester urethane and 3 parts by weight of polyvinyl formal is used as binder, i.e., the binder of Example 1.

In each case 1 inch magnetic tapes were prepared. The results obtained with these tapes are given in Table II. The surface roughness was measured with a Perth-O-Meter manufactured by Fa. Perthen, Hanover, Germany. The signal level and signal-to-noise ratio values refer to a commercial standard tape and are relative values. In all tests a conventional helical scan video tape recorder was used. By "functions perfectly" we mean that the magnetic tapes accelerate without difficulty in start/stop operation, ensure perfect reproduction of the signal in stop motion for more than 1 hour, and do not form deposits of any kind on the heads even after being stored at a temperature of 60°C and 90% humidity for 14 days.

TABLE II

| | Comp. Exp. L | Comp. Exp. M | Comp. Exp. N | Example 7 |
|---|---|---|---|---|
| Surface roughness (/μ) | 0.08 | 0.09 | 0.08 | 0.07 |
| Coercive force (oersteds) | 270 | 251 | 265 | 285 |
| Orientation ratio* | 1.38 | 1.59 | 1.55 | 1.60 |
| Signal level (decibels) | + 1.5 | − 0.8 | + 1.0 | + 1.5 |
| Signal-to-noise ratio (decibels) | + 0.5 | − 3.5 | − 1.0 | + 1.0 |
| Behavior on video recorder | blocks; sticks | functions perfectly | blocks; sticks particularly after being stored under conditions of high humidity | functions perfectly |

*the ratio of residual induction in the direction of tape travel to residual induction in the crosswise direction.

Comparative Experiment O

A tube mill having a capacity of 6000 parts by volume is charged with 5000 parts by weight of steel balls 4 to 6 mm in diameter and with the following mixture:

350 parts by weight of acicular γ-iron(III) oxide, 600 parts by weight of a mixture of equal parts by weight of methylene chloride, methanol and monochlorobenzene, and 50 parts by weight of a 20% by weight solution of polyvinyl formal in the same solvent mixture.

EXAMPLE 8 and Comparative Experiment O

A tube mill having a capacity of 250 parts by volume is charged with 300 parts by weight of steel balls having a diameter of from 4 to 6 mm and with the following mixture:

27 parts by weight of acicular γ-iron(III) oxide; 0.54 part by weight of stearic acid; 0.54 part by weight of a pulverulent mixture of 75% by weight of quartz and 25% by weight of kaolinite (max. particle size 15 μ); 21.8 parts by weight of an 8.5% by weight solution of the polyvinyl formal used in Example 2 in a mixture of equal parts by weight of tetrahydrofuran and dioxane; 6.07 parts by weight of an 8.5% by weight solution of the polyester urethane used in Example 1 in the same solvent mixture; 0.206 part by weight of isodecyl phthalate; and 15.4 parts by weight of a mixture of equal parts by weight of tetrahydrofuran and dioxane.

This mixture is dispersed for 3½ days and then 31.4 parts by weight of the above polyvinyl formal solution, 8.68 parts by weight of the above polyester urethane solution, 0.236 parts by weight of isodecyl phthalate and 0.054 part by weight of polydimethylsiloxane are added.

Dispersion is continued for a further 24 hours, following which the resulting magnetic dispersion is filtered under pressure through filter paper and applied to 12 μ polyethylene terephthalate film using a knife coater is such an amount that there is obtained after drying a magnetic layer 6 μ in thickness. The coated web is then passed between heated steel rolls (60°C) at a nip pressure of about 5 kg/cm, and slit into tapes ¼ inch wide.

This Example is in accordance with the present invention.

This mixture is dispersed for 48 hours and then a further 350 parts by weight of the above 20% by weight polyvinyl formal solution and 40 parts by weight of a phenyl ester of sulfochlorinated hydrocarbon as plasticizer are added. Dispersion is continued for a further 24 hours. Further treatment is as described in Example 8.

The resulting magnetic tapes were then tested.

The sensitivity and harmonic distortion were determined according to DIN 45,512, page 2, with reference to a commercial reference tape.

| | Example 8 | Comp. Exp. 0 |
|---|---|---|
| Sensitivity (decibels) | − 1.8 | − 4.6 |
| Harmonic distortion (decibels) | + 30.5 | + 24.5 |

The following blocking test was carried out:

Tape was wound onto a small hub and stored at a temperature of 54.5°C for 16 hours at 85% relative humidity and then for 4 hours at 20% relative humidity. Afterwards the ease with which the first three windings unrolled was determined.

| Example 8 | Comp. Exp. 0 |
|---|---|
| uncoils | blocks |

Another property which is important because of static build-up during operation is the electrical resistance of the magnetic coating.

| | Example 8 | Comp. Exp. 0 |
|---|---|---|
| specific surface resistance (G Ω) | 0.035 per square | 1.7 per square |
| specific surface resistance after continuous operation for 24 hours (G Ω) | 0.10 per square | 30.0 per square |

It can be seen from the foregoing that the properties of the magnetic tape according to the invention are superior to those of the comparison product in every instance.

We claim

1. A magnetic recording medium comprising a non-magnetic support and, applied thereto, a magnetic layer based on a finely divided magnetic pigment dispersed in a polyurethane-containing binder mixture, wherein the said polyurethane-containing binder mixture consists essentially of a mixture of a. 15 to 80 parts by weight of a soluble, hydroxyl free, thermoplastic polyester urethane and prepared from an aliphatic dicarboxylic acid of 4 to 6 carbon atoms, an aliphatic diol of 3 to 10 carbon atoms and a diisocyanate of 8 to 20 carbon atoms, and b. 20 to 85 parts by weight of a polyvinyl formal containing at least 80% by weight of vinyl formal groups.

2. A magnetic recording medium as claimed in claim 1, wherein said binder mixture consists of 60 to 80 parts by weight of polyester urethane and 20 to 40 parts by weight of polyvinyl formal.

3. A magnetic recording medium as claimed in claim 1, wherein the polyvinyl formal binder contains 5 to 13% by weight of vinyl alcohol groups, 7 to 15% by weight of vinyl acetate groups and 80 to 88% by weight of vinyl formal groups.

4. A magnetic recording medium as claimed in claim 1, wherein the polyester urethane is a reaction product of 4,4'-diisocyanatodiphenylmethane, butanediol-1,4 and adipic acid.

* * * * *